R. LOOG.
EXPANSIBLE BRACELET.
APPLICATION FILED MAY 31, 1912.
1,089,931.
Patented Mar. 10, 1914.
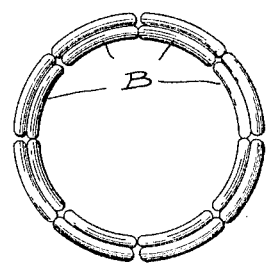
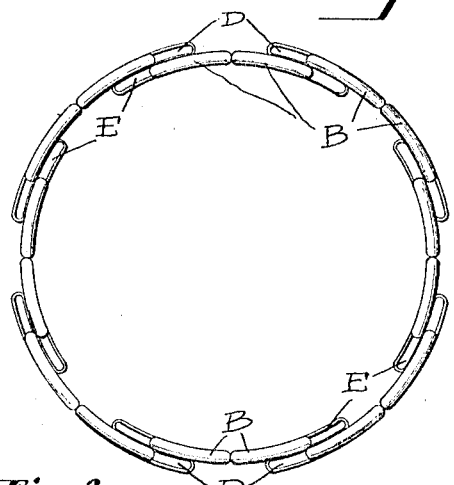
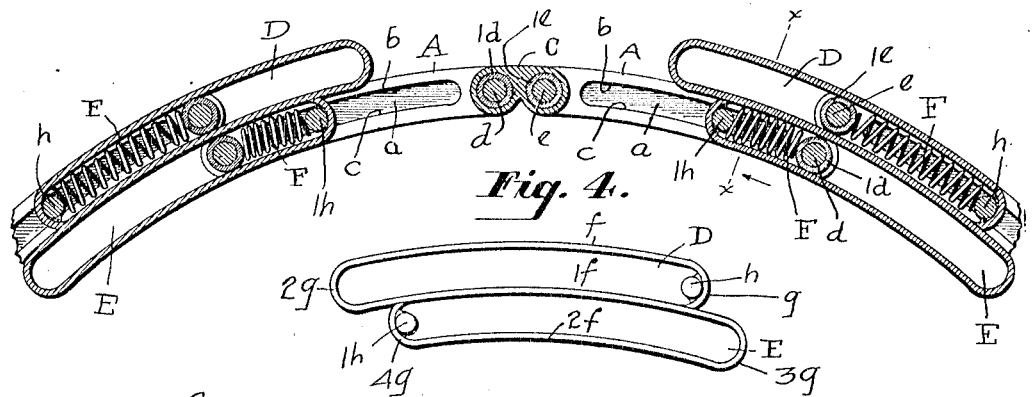
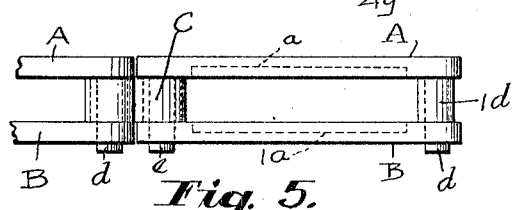
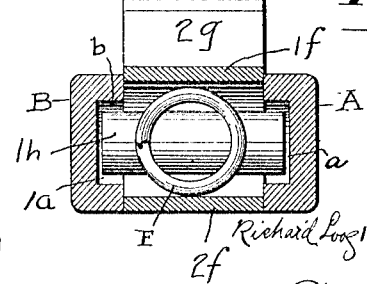
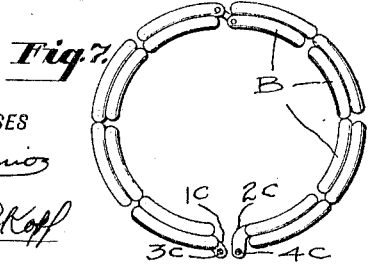
WITNESSES
Richard Loog INVENTOR
BY Philip K Stern
his ATTORNEY

UNITED STATES PATENT OFFICE.

RICHARD LOOG, OF PFORZHEIM, GERMANY.

EXPANSIBLE BRACELET.

1,089,931.    Specification of Letters Patent.    Patented Mar. 10, 1914.

Application filed May 31, 1912. Serial No. 700,824.

*To all whom it may concern:*

Be it known that I, RICHARD LOOG, a subject of the Emperor of Germany, residing at Pforzheim, in the Duchy of Baden, Germany, have invented certain new and useful Improvements in Expansible Bracelets, of which the following is a specification.

My invention in expansible bracelets, relates to a bracelet structure consisting of a plurality of links and springs so articulated as to enable the structure to expand and contract within limits, determined by the play between the links and the number thereof involved in the structure. In this connection my invention has particular reference to the method of construction whereby a larger range of expansion and contraction is permissible, than by the structures hitherto in vogue, and previous to my invention, in so far as I am at present aware, and the object of my invention is to provide a more durable and more effective construction for expansion bracelets than those hitherto in vogue, and the features of my invention whereby I attain this object are characterized in the drawings hereto attached which when taken with the correlative descriptive matter appended, forms part of this specification and the distinct features of novelty are pointed out in the claims at the conclusion thereof.

With reference to the drawings: Figure 1 is a side elevational view of a braclet made in accordance with my invention, of substantially full size and illustrating the bracelet in a contracted condition. Fig. 2 is a similar view thereof illustrating the same in an expanded condition; the two views illustrating the range of expansibility of the bracelet. Fig. 3 is an enlarged vertical sectional detailed view of the link member and guide pins and a side elevational view of the springs involved. Fig. 4 is an enlarged detailed view of one of my improved link units together with its guide pins. Fig. 5 is a top plan view of another link member and a fragmentary view of a similar adjacent one together with a swiveling block or short connecting link. Fig. 6 is an enlarged cross sectional view of the structure taken on a line $x$—$x$ of Fig. 3 in a direction as indicated by the dart. Fig. 7 illustrates a modification of my improved bracelet, wherein the structure is diametrically divided into two semi-ring link structures in lieu of one continuous ring as illustrated in Figs. 1 and 2.

In the several figures similar characters of reference are employed to designate like or the same parts where they occur wherein—

A refers to one of my improved link plates which is provided with a longitudinal guide way $a$ pressed or otherwise formed in the inner surface thereof which has two parallel lateral walls $b$ and $c$ extending longitudinally along the link plate A opposite each other. The guide way $a$ and the walls $b$ and $c$ thereof have preferably a rectangular cross section as will be clear by the illustration Fig. 6. The link plate A carries a pair of terminal studs $d$ and $e$; these are of uniform cylindrical formation and project from the inner surface of the link plate A in the same direction and at right angles thereto and parallel to each other.

Oppositely situated to the link plate A and similarly constructed is a link plate B having a guide way $1^a$ of similar formation to that of the guide way $a$ and oppositely situated with relation thereto when the link plate B is located in apposition to the link plate A. Carried by and rigidly secured to the terminals of the link plate B are cylindrical tubular studs $1^c$ and $1^d$ which are adapted to telescope with and snugly fit the studs $d$ and $e$ of the link plate A.

C designates a swivel block or short link which is provided with two transverse parallel adjacently situated perforations for the reception of the tubular studs $1^d$ and $1^c$ of adjacent link plates A and B.

D and E refer to a superimposed link structure which is adapted to play between the link plates A and B; this is formed preferably of a strip of material bent or otherwise constructed so as to form the parallel curved walls $f$, $1^f$, $2^f$ and the curved ends $g$, $2^g$, $3^g$ and $4^g$. Secured to and carried by the curved ends $g$ and $4^g$ are guide pins $h$ and $1^h$; these are of cylindrical formation and of a size adapted to slidably fit and play in the guide ways $a$ and $1^a$ of the link plates A and B while the walls $f$ and $1^f$ have a similar sliding fit with a tubular stud $1^d$ of the respective superimposed link plates B and A having the involved studs $d$ as elucidated in the enlarged sectional view Fig. 3.

Interposed between the guide pins $h$ and $1^h$ of a pair of superimposed integral links D and E and studs $d$, $e$, $1^b$ and $1^e$ respectively, of the coöperative link plates A and B, are spiral compression springs F; these are incased between the upper and lower walls $f$ and $1^f$ and $2^f$ respectively of the superimposed link structures D and E and between the lateral guide way $a$ and $1^a$ of the link plates A and B respectively, and are pocketed therein and there between. One end of these thrusts against the respective cylindrical tubular studs $1^d$ and $1^e$, and the opposite end thrusts against the respective guide pins $h$ and $1^h$, whereby upon the expansion of the structure, in extending the links as illustrated in Figs. 2 and 3, these springs will have become compressed and upon releasing the structure when thus expanded the re-action of said compression springs thrusting against their respective abutments namely the studs $1^d$ and guide pins $h$ and studs $1^e$ and guide pins $1^h$ respectively will force the superimposed link structures D and E to slide in opposite directions, thus effecting a contraction of the bracelet.

In the assembling of the different elements and units of my improved expansion bracelet, the link member B carrying the tubular studs $1^d$ and $1^e$ is applied to the superimposed structures D and E laterally, and the guide pin $1^h$ of the link E of the superimposed structures D and E is introduced into the guide way $1^a$ of a link plate B while the tubular studs $1^d$ of the said link plate is passed through the link E of the superimposed link structures D and E. The next member to assemble is another unit or link plate B with the link D of the superimposed link structures D and E to similarly engage the latter link of the said link structure. The next operation will be to introduce the compression springs F between the tubular stud $1^d$ of the link plate B and the guide pin $1^h$ of the open link E of the superimposed link structures D and E, after which the swivel block or short connecting link C is introduced to the corresponding tubular stud $1^e$ in a manner so as to leave substantially one-half of the said swivel block projecting for engagement with the next pair of link structures, after which the link plate A is introduced as a cover plate for the spring F and the guide pin $1^h$ and the ends of the tubular studs $1^d$ and $1^e$. In the assembling of the plate A the guide way $a$ is placed in a position opposite the guide way $1^a$ of the link plate B in a manner whereby the curved formation of both guide ways corresponds; while the guide pins $d$ and $e$ are introduced into the corresponding tubular studs $1^d$ and $1^e$ of the link plate B. After thus assembling the link plates A and B they are secured against lateral displacement by heading the ends of the guide pins $d$ and $e$ whereby the link plates A and B will be securely riveted together. It must be understood however, that the swiveling blocks or short connecting links C must be sufficiently narrower than the length of the tubular studs $1^d$ to obviate their being jammed between the link plates A and B. The articulating of the respective link plates A and B and the swivel block C, and the compression springs F is similarly proceeded with throughout the structure until the desired length in the formation of the bracelet has been attained.

In Fig. 7 I have illustrated a form of bracelet constructed in accordance with my invention, whereby one-half of the circumference of the bracelet is linked with another half in a manner whereby means for closing the same around the wrist of the wearer is accomplished in lieu of the stretching of the bracelet over the hand, and in this connection I have provided a pair of terminal links $1^c$ and $2^c$ provided with eyes $3^c$ and $4^c$ which may be held together by a lock or other fastening device.

It will be observed by the foregoing description of my improved bracelet that by superimposing the links D and E upon each other, a considerable wide range of expansion of the bracelet from its contracted condition is permissible, while its neatness and artistic effect is not jeopardized by the superposition of the link structures D, E, and Having fully described my invention I claim as new and desire to secure by Letters Patent of the United States.

1. An expansible bracelet, consisting of an inner and outer series of links, each link of both series comprising two grooved side pieces secured together in spaced relation by a solid stud at each end of one piece and corresponding tubular studs on the other piece, a part located between the side pieces of each link of each series, said part comprising an integral frame formed into superimposed link parts and slidably connected to the said two grooved side pieces, substantially as described.

2. An expansible bracelet, consisting of an inner and outer series of links, each link of both series comprising two grooved side pieces secured together in spaced relation by a solid stud at each end of one piece and corresponding tubular studs on the other piece, a part located between the side piece of each link of each series, said part comprising an integral frame formed into superimposed link parts, and having guide pins, and a spring bearing against each of said guide pins and tubular studs.

In testimony whereof, I have signed my name to this specification in the presence of two subscribing witnesses.

RICHARD LOOG.

Witnesses:
F. X. GEORGES,
R. REIMSEN.